US010361971B2

(12) United States Patent
He et al.

(10) Patent No.: US 10,361,971 B2
(45) Date of Patent: Jul. 23, 2019

(54) RESOURCE RESERVATION MECHANISM FOR OVERLAY NETWORKING

(71) Applicant: International Business Machines Corporation, Armonk, NY (US)

(72) Inventors: Guo Xing He, Suzhou (CN); Zi Jin Tao, Wuxi (CN); Lu Zhang, Wuxi (CN); Yuan Yuan Zhang, Wuxi (CN)

(73) Assignee: International Business Machines Corporation, Armonk, NY (US)

( * ) Notice: Subject to any disclaimer, the term of this patent is extended or adjusted under 35 U.S.C. 154(b) by 189 days.

(21) Appl. No.: 15/252,848

(22) Filed: Aug. 31, 2016

(65) Prior Publication Data
US 2018/0063023 A1    Mar. 1, 2018

(51) Int. Cl.
*H04L 12/927* (2013.01)
*H04L 12/851* (2013.01)
*H04L 12/913* (2013.01)

(52) U.S. Cl.
CPC .......... *H04L 47/805* (2013.01); *H04L 47/724* (2013.01)

(58) Field of Classification Search
CPC . H04L 47/724; H04L 47/805; H04L 41/5003; H04W 28/26; H04W 76/20; G06F 15/16
USPC .................. 709/223, 226, 230; 370/351, 253
See application file for complete search history.

(56) References Cited

U.S. PATENT DOCUMENTS

| | | | | |
|---|---|---|---|---|
| 6,671,276 B1* | 12/2003 | Bakre | ................. | H04L 12/1836 370/390 |
| 7,065,092 B2* | 6/2006 | Chen | .................... | H04L 47/724 370/352 |
| 7,532,613 B1* | 5/2009 | Sen | ........................ | H04L 47/724 370/352 |
| 2004/0004955 A1* | 1/2004 | Lewis | ................. | H04L 12/4633 370/351 |
| 2004/0022250 A1* | 2/2004 | Chen | .................... | H04L 12/5692 370/395.43 |
| 2004/0172464 A1* | 9/2004 | Nag | ........................ | H04L 47/822 709/223 |
| 2006/0215633 A1* | 9/2006 | Jennings | ............. | H04L 41/5003 370/352 |

(Continued)

FOREIGN PATENT DOCUMENTS

EP    2892183    8/2015
WO    2012/055446    5/2012

OTHER PUBLICATIONS

Braden et al., "Resource ReSerVation Protocol (RSVP)—Version 1 Functional Specification," IETF, Network Working Group, Sep. 1997, 112 pages.

*Primary Examiner* — Tesfay Yohannes
(74) *Attorney, Agent, or Firm* — Van Leeuwen & Van Leeuwen; David B. Waycechowsky

(57) ABSTRACT

An approach is provided in which an information handling system establishes a resource reservation protocol (RSVP) session corresponding to a flow between a first entity and a second entity operating within a computer environment that implements a network virtualization overlay protocol. Once the RSVP session is established, the information handling system encapsulates data packets of the flow based on the network virtualization overlay protocol and, in turn, sends the encapsulated data packet over the computer network with a quality of service (QoS) assurance level that is based on the established RSVP session.

17 Claims, 9 Drawing Sheets

(56) References Cited

U.S. PATENT DOCUMENTS

| | | | |
|---|---|---|---|
| 2006/0259608 A1* | 11/2006 | Kim | H04L 12/4633 |
| | | | 709/223 |
| 2006/0259641 A1* | 11/2006 | Kim | H04L 29/12443 |
| | | | 709/245 |
| 2007/0198735 A1* | 8/2007 | Kim | H04L 29/12358 |
| | | | 709/230 |
| 2012/0008632 A1* | 1/2012 | Liu | H04L 47/724 |
| | | | 370/395.5 |
| 2017/0373990 A1* | 12/2017 | Jeuk | H04L 69/22 |

* cited by examiner

RESOURCE RESERVATION MECHANISM FOR OVERLAY NETWORKING

BACKGROUND

The present disclosure relates to providing resource reservation quality of service (QoS) capabilities in a cloud-based computer environment utilizing a network virtualization overlay protocol.

Computer environments today support multiple types of data traffic that require different quality of service levels. A computer environment may be required to provide low-latency capabilities for critical network traffic, such as voice or streaming media, while also providing simple best-effort service to non-critical services such as web traffic or file transfers.

Two models that are used to support multiple QoS levels on computer environments are 1) Integrated Services (IntServ) and 2) Differentiated Services (DiffServ). IntServ provides a rich but more complex QoS solution by providing end-to-end signaling for each session (e.g., flow). DiffServ provides a relatively simple and coarse method of categorizing traffic into different classes and applying QoS parameters to those classes.

IntServ uses a Resource Reservation Protocol (RSVP) as a transport layer protocol designed to reserve resources across the computer environment for the integrated services. RSVP is a receiver-initiated setup of resource reservations for multicast or unicast data flows with scaling and robustness and may be used by hosts or routers to request or deliver specific levels of quality of service for application data streams or flows. To establish an RSVP session between entities, a first entity sends an RSVP path message to a second entity. The RSVP path message traverses through the computer environment to collect information pertaining to the path via traffic spec (Tspec). The second entity, in turn, sends an RSVP reserve message back to the first entity to confirm the reservation and commence transmitting data packets.

Computer environments have gravitated to cloud computing as a preferred computing environment due to its versatility over traditional computer environments. One aspect of a cloud-computing environment's versatility is its ability to support multiple tenants. To support multiple tenants, cloud-computing environments implement network virtualization overlay protocols, which provides each tenant its own address space that may overlap other tenants' address spaces. Network virtualization overlay protocols utilize packet encapsulation, and network virtualization over layer 3 (NVO3) is becoming one of the preferred protocols. NVO3 provides a tunnel technology that encapsulates layer 2 packets to the layer 3 layer and adds an overlay header to extend and divide needed address spaces. One of the prominent NVO3 protocols is Virtual eXtensible LAN (VXLAN), which extend the virtual LAN (VLAN) address space by adding a 24-bit segment ID to increase the number of available IDs.

BRIEF SUMMARY

According to one embodiment of the present disclosure, an approach is provided in which an information handling system establishes a resource reservation protocol (RSVP) session corresponding to a flow between a first entity and a second entity operating within a computer environment that implements a network virtualization overlay protocol. Once the RSVP session is established, the information handling system encapsulates data packets of the flow based on the network virtualization overlay protocol and, in turn, sends the encapsulated data packet over the computer network with a quality of service (QoS) assurance level that is based on the established RSVP session.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present disclosure, as defined solely by the claims, will become apparent in the non-limiting detailed description set forth below.

BRIEF DESCRIPTION OF THE SEVERAL VIEWS OF THE DRAWINGS

The present disclosure may be better understood, and its numerous objects, features, and advantages made apparent to those skilled in the art by referencing the accompanying drawings, wherein.

DETAILED DESCRIPTION

Figure 1:
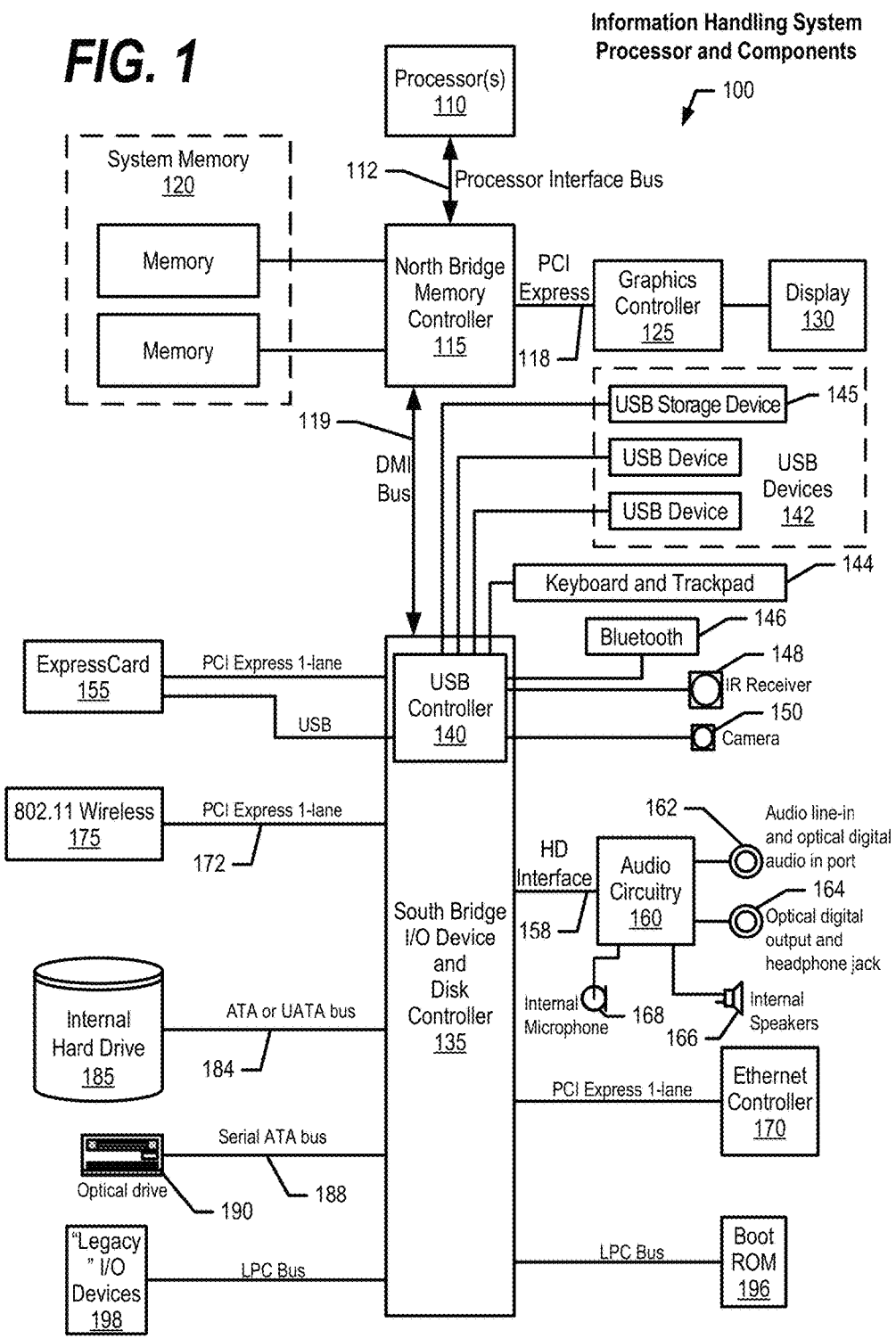
FIG. 1 is a block diagram of a data processing system in which the methods described herein can be implemented.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. The following detailed description will generally follow the summary of the disclosure, as set forth above, further explaining and expanding the definitions of the various aspects and embodiments of the disclosure as necessary.

FIG. 1 illustrates information handling system 100, which is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, Peripheral Component Interconnect (PCI) Express bus 118 connects Northbridge 115 to graphics controller 125. Graphics controller 125 connects to display device 130, such as a computer monitor.

Northbridge 115 and Southbridge 135 connect to each other using bus 119. In one embodiment, the bus is a Direct Media Interface (DMI) bus that transfers data at high speeds in each direction between Northbridge 115 and Southbridge 135. In another embodiment, a PCI bus connects the Northbridge and the Southbridge. Southbridge 135, also known as the Input/Output (I/O) Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and Universal Serial Bus (USB) connectivity as it connects to Southbridge 135 using both the USB and the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, Integrated Services Digital Network (ISDN) connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera.

Wireless Local Area Network (LAN) device 175 connects to Southbridge 135 via the PCI or PCI Express bus 172. LAN device 175 typically implements one of the Institute of Electrical and Electronic Engineers (IEEE) 802.11 standards of over-the-air modulation techniques that all use the same protocol to wireless communicate between information handling system 100 and another computer system or device. Optical storage device 190 connects to Southbridge 135 using Serial Analog Telephone Adapter (ATA) (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, Automated Teller Machine (ATM), a portable telephone device, a communication device or other devices that include a processor and memory.

Figure 2:
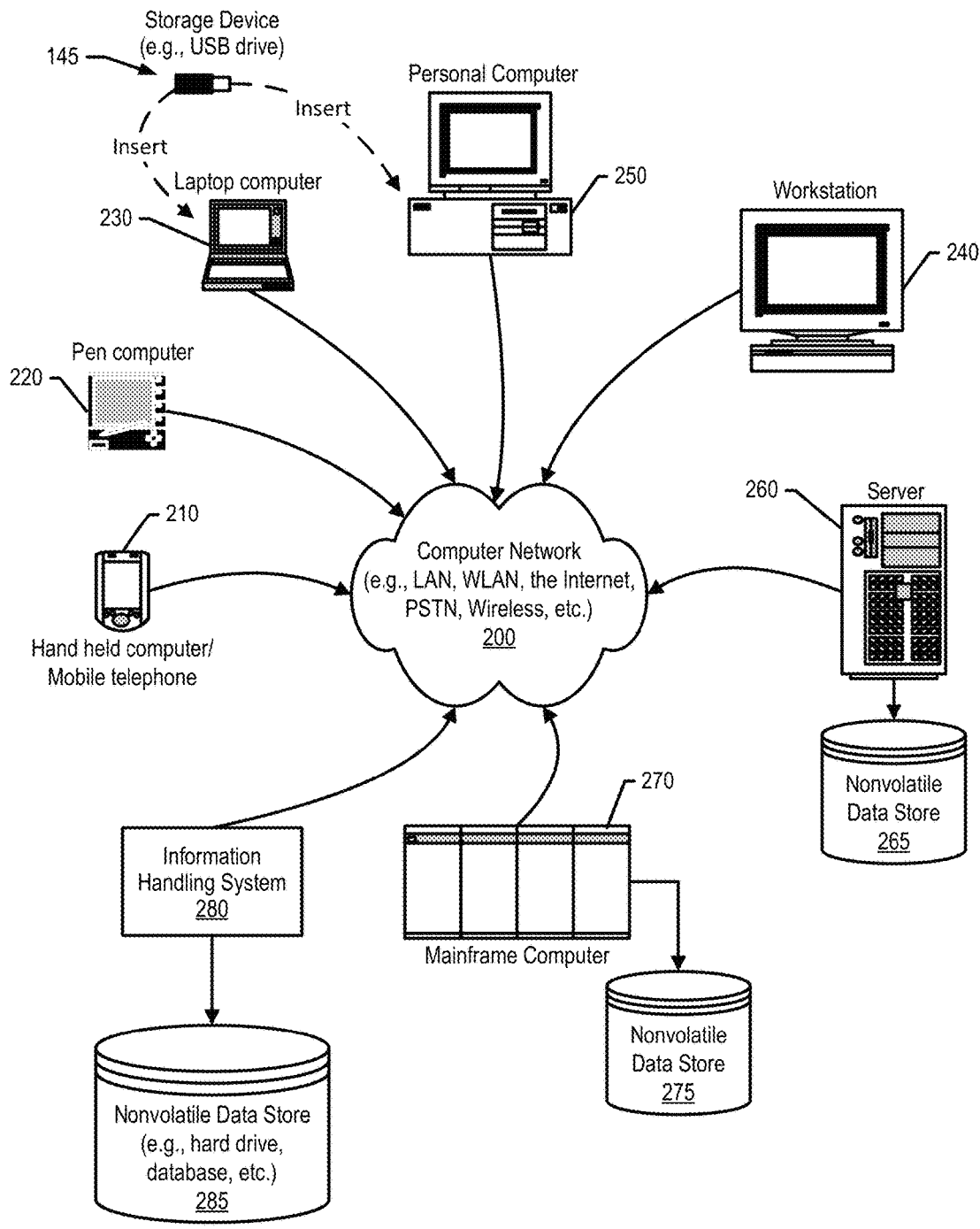
FIG. 2 provides an extension of the information handling system environment shown in FIG. 1 to illustrate that the methods described herein can be performed on a wide variety of information handling systems which operate in a networked environment.

FIG. 2 provides an extension of the information handling system environment shown in FIG. 1 to illustrate that the methods described herein can be performed on a wide variety of information handling systems that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as Moving Picture Experts Group Layer-3 Audio (MP3) players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 2 depicts separate nonvolatile data stores (server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

FIGS. 3 through 9 depict an approach that can be executed on an information handling system to provide resource reservation protocol (RSVP) quality of service (QoS) sessions in a cloud-based computer environment utilizing a protocol that implements network virtualization overlays. Cloud computing environments that utilize network virtualization overlay protocols require an approach to provide QoS capabilities. However, issues arise with the prior art because QoS information is typically embedded within data packets and are not visible to network nodes because the data packets are encapsulated with network virtualization overlay headers.

As discussed herein, network virtualization edges (NVE) work as a bridge for RSVP capabilities between virtual overlay networks and physical underlay networks. A first virtual machine initiates an RSVP path message for a flow to a first network virtualization edge. The first network virtualization edge creates mapping information that maps the flow to the first network virtualization edge's physical properties. The first network virtualization edge sends an overlay RSVP path message, which includes the mapping information, to a second network virtualization edge, and also sends an underlay RSVP path message to the second network virtualization edge that includes the physical properties of the first network virtualization edge. The second network virtualization edge uses the mapping information to map the overlay RSVP path message to the underlay RSVP path message, and creates an integrated RSVP path message that it sends to a second virtual machine.

The second virtual machine initiates an RSVP reservation (reserve) message based on the integrated RVSP path message and sends the RSVP reserve message back to the second network virtualization edge. The second network virtualization edge uses the mapping information to create an overlay RSVP reserve message and an underlay RSVP reserve message, which it sends back to the first network virtualization edge. The first network virtualization edge uses the mapping information to map the overlay RSVP reserve message to the underlay RSVP reserve message, and creates an integrated RSVP reserve message that it sends to the first virtual machine to establish the RSVP session and commence sending data packets over the computer network that have a quality of service assurance based on the established RSVP session.

Figure 3:
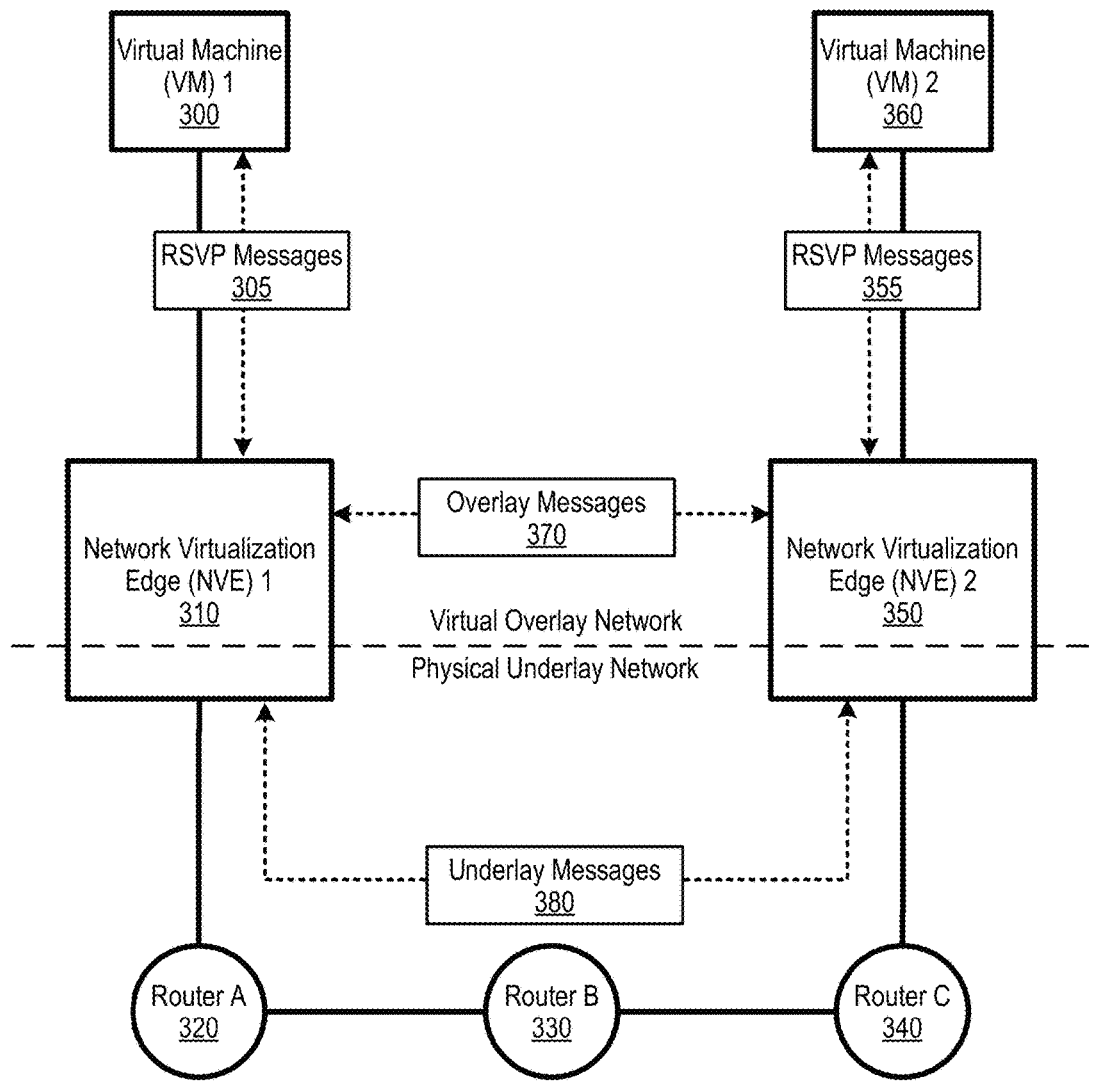
FIG. 3 is an exemplary high level diagram depicting a cloud-based computer environment providing Resource Reservation Protocol (RSVP) capabilities while implementing a network virtualization overlay protocol.

FIG. 3 is an exemplary high level diagram depicting a cloud-based computer environment providing Resource Reservation Protocol (RSVP) capabilities while implementing a network virtualization overlay protocol such as network virtualization over layer 3 (NVO3). The computer environment shown in FIG. 3 includes entities such as virtual machines (300 and 360), network virtualization edges (310 and 350), and routers (320, 330, and 340). Network virtualization edges 310 and 350 bridge RSVP capabilities between the virtual overlay network and the physical underlay network. RSVP messages 305, 355, and overlay messages 370 establish an RSVP session in the virtual overlay network, while underlay messages 380 establish the RSVP session in the physical underlay layer. As those skilled in the art can appreciate, computer environments may have more, less and/or different entities than what is shown in FIG. 3.

Network virtualization edges 310 and 350 map overlay messages 370 to underlay messages 380 by maintaining a resource mapping that maps flow information of a data flow to network virtualization edge properties. In one embodiment, the flow information includes a virtual machine IP address, a virtual machine source port assigned to the flow, a virtual network identifier (VNID) assigned to the flow, and a protocol ID. The network virtualization edge properties include a network virtualization edge IP address, a unique source port assigned to the flow, and a protocol ID. Network virtualization edge 1 310 provides the resource mapping to network virtualization edge 2 370 when initiating an RSVP session, which includes sending an overlay RSVP path message and an underlay RSVP path message to network virtualization edge 2 350. In turn, network virtualization edge 2 350 uses the resource mapping to return an overlay RSVP reserve message and an underlay RSVP reserve message back to network virtualization edge 1 310 to establish the RSVP session between virtual machine 1 300 and virtual machine 2 360 (see FIGS. 4, 6, and corresponding text for further details).

Figure 4:
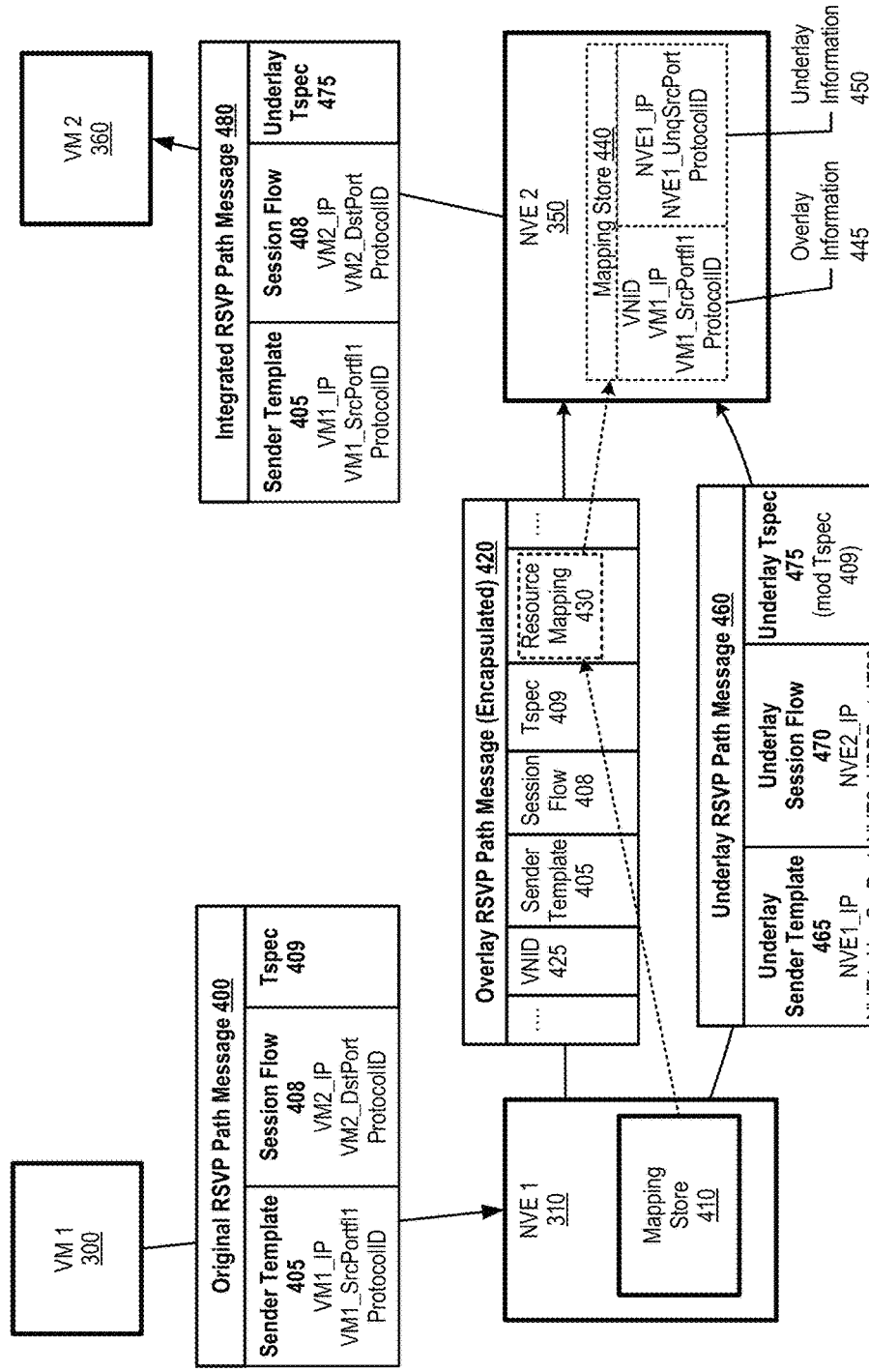
FIG. 4 is an exemplary detail diagram depicting a network virtualization edge receiving an RSVP path message from a virtual machine and sending an overlay RSVP path message and an underlay RSVP path message to a destination network virtualization edge.

FIG. 4 is an exemplary detail diagram depicting a network virtualization edge receiving an RSVP path message from a virtual machine and sending an overlay RSVP path message and an underlay RSVP path message to a destination network virtualization edge.

Virtual machine 1 300 initiates an RSVP session for a new flow by sending original RSVP path message 400 to network virtualization edge 1 310. Original RSVP path message 400 includes a sender template, a session flow, and a traffic spec (Tspec 409). Sender template 405 includes virtual machine 1 300's IP address, a source port assigned to the flow by virtual machine 1 300 (VM1_SrcPortfl1), and a protocol ID. Tspec 409 is based on QoS service level agreements of the new flow, such as an agreed upon priority of corresponding data packets by a tenant.

Network virtualization edge 1 310 receives original RSVP path message 400 and assigns a unique user datagram protocol (UDP) source port to the flow, which is a distinguishing parameter of the flow in the physical underlay network (discussed below). Network virtualization edge 1 310 then stores a resource mapping entry in mapping store 410 that maps the unique UDP source port and other network virtualization edge 1 310 parameters to the flow. As discussed herein, the resource mapping information links underlay RSVP messages to overlay RSVP messages, which allows RSVP capabilities in a cloud-based computer environment utilizing a network virtualization overlay protocol.

Network virtualization edge 1 310 adds the original rsvp path message 400 in overlay RSVP path message 420 (sender template 405, session flow 408, and Tspec 409, the resource mapping information (resource mapping 430), and also a virtual network identifier (VNID) 425 corresponding to virtual machine 1 300 to distinguish virtual machine 1

300's flow in multi-tenant environments. For example, a multi-tenant cloud based environment may assign two tenants to two different virtual machines that have the same IP address and have the same source port assignments. As such, the different VNIDs corresponding to the two different tenants distinguish the two virtual machines from each other.

Network virtualization edge 1 310 also creates underlay RSVP path message 460. Underlay RSVP path message 460 includes underlay sender template 465, which includes network virtualization edge 1 310's IP address, the unique UDP source port assigned to the flow by network virtualization edge 1 310 discussed above, and a protocol ID. Underlay session flow 470 includes network virtualization edge 2 350's IP address, a UDP port assigned by network virtualization edge 2 350 to receive traffic (e.g., 4789), and a protocol ID. Underlay Tspec 475 begins as Tspec 409 and may be modified by nodes in the computer environment (e.g., routers 320, 330, 340) as underlay RSVP path message 460 traverse through the computer environment.

Network virtualization edge 2 350 receives overlay RSVP path message 420 and stores resource mapping 430 mapping store 440. Overlay information 445 corresponds to sender template 405 and underlay information 450 corresponds to the underlay RSVP path message's sender template (underlay sender template 465). Network virtualization edge 2 350 uses resource mapping 440 to match the correct underlay RSVP path message to overlay RSVP path message 420 (discussed below).

In one embodiment, network virtualization edge 2 350 sets a timer and waits to receive underlay RSVP path message 460. When network virtualization edge 2 350 receives underlay RSVP path message 460, network virtualization edge 2 350 matches underlay sender template 465 to underlay information 450. If network virtualization edge 2 350 does not receive underlay RSVP path message 460 before the timer expires, network virtualization edge 2 350, in one embodiment, removes the resource mapping entry from mapping store 440.

Network virtualization edge 2 350 maps underlay RSVP path message 460 to overlay RSVP path message 420 based on resource mapping 430. Network virtualization edge 2 350 then creates integrated RSVP path message 480 by including the sender template 405 and session flow 408 from overlay RSVP path message 420 with underlay Tspec 475 from underlay RSVP path message 460. As discussed above, underlay Tspec 475 may be modified from its original Tspec 409 by nodes in the physical underlay network (e.g., routers 320, 330, and 340). Virtual machine 2 360 receives integrated RSVP path message 480 and generates a corresponding RSVP reserve message to be sent back to virtual machine 1 300 (see FIG. 5 and corresponding text for further details).

Figure 5:
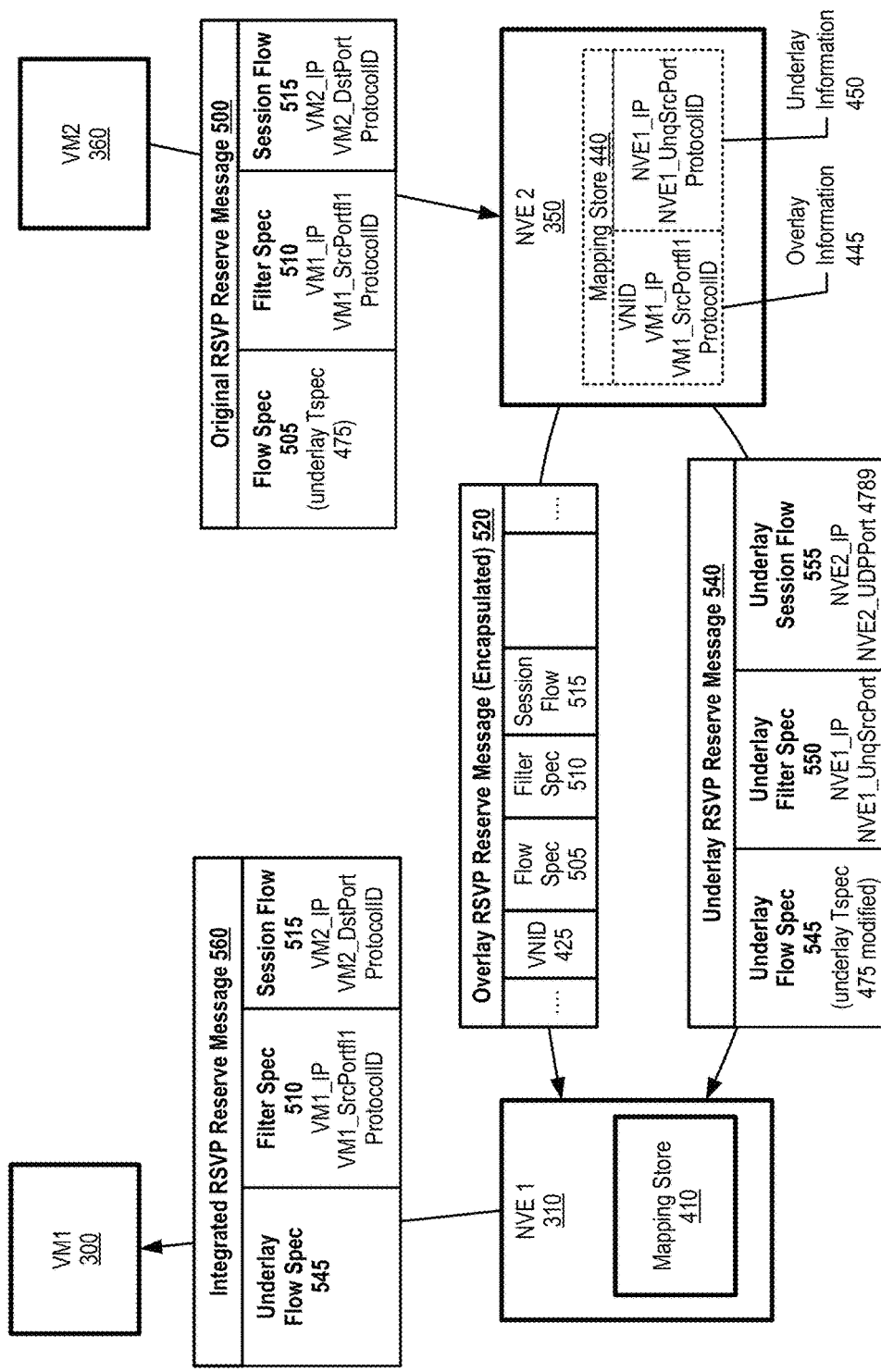
FIG. 5 is an exemplary detail diagram depicting a network virtualization edge receiving an RSVP reserve message from a virtual machine and sending an overlay RSVP reserve message and an underlay RSVP reserve message to a corresponding network virtualization edge.

FIG. 5 is an exemplary detail diagram depicting a network virtualization edge receiving an RSVP reserve message from a virtual machine and sending an overlay RSVP reserve message and an underlay RSVP reserve message to a corresponding network virtualization edge.

Virtual machine 2 360 creates original RSVP reserve message 500 based on integrated RSVP path message 480 (FIG. 4). Original RSVP reserve message 500 includes filter spec 510, which includes virtual machine 1 300's information from sender template 405 in integrated RSVP path message 480 (FIG. 4). Session flow 515 includes virtual machine 2 360's IP address, a destination port, and a protocol ID. Flow spec 505 includes underlay Tspec 405 that was included in integrated RSVP path message 480.

Network virtualization edge 2 520 receives original RSVP reserve message 500 and creates overlay RSVP reserve message 520 using filter spec 510, session flow 515, and flow spec 505. Network virtualization edge 2 520 also adds the flow's VNID 425 into overlay RSVP reserve message 520 that, in one embodiment, it obtains from mapping store 440.

Network virtualization edge 2 350 also uses mapping store 440 to match filter spec 510's information to overlay information 445, which maps to underlay information 450 that network virtualization edge 2 350 utilizes to create underlay RSVP reserve message 540. Underlay RSVP reserve message 540 includes underlay flow spec 545, underlay filter spec 550, and underlay session flow 555. Underlay flow spec 545 includes flow spec 505, which may be modified as it traverses through the cloud-based computer environment to network virtualization edge 1 310 (e.g., routers 320, 330, and 340). Underlay filter spec 550 includes underlay information 450, and underlay session flow 555 includes network virtualization edge 2 350 information such as its IP address, its unique UDP port, and a protocol ID.

Network virtualization edge 1 310 uses resource mapping information in mapping store 410 to map overlay RSVP reserve message 520's filter spec 510 to underlay RSVP reserve message 540's underlay filter spec 550. In turn, network virtualization edge 310 creates integrated RSVP reserve message 560 that includes filter spec 510 and session flow 515 from overlay RSVP reserve message 520, and underlay flow spec 545 from underlay RSVP reserve message 540. In one embodiment, network virtualization edge 1 310 compares underlay flow spec 545 to flow spec 505 and, if no differences exist, network virtualization edge 1 410 utilizes flow spec 505 in integrated RSVP reserve message 560.

Virtual machine 1 300 receives integrated RSVP reserve message 560 and the RSVP session is established between virtual machine 1 300 and virtual machine 2 360. At this point, resource reservation quality of service (QoS) capabilities are applied to data packets corresponding to the flow as they traverse through the cloud-based computer environment that implements a network virtualization overlay protocol. When the data packets are sent by virtual machine 1 300, network virtualization edge 1 310 uses mapping table 410 to apply the corresponding network virtualization overlay encapsulation (e.g., Virtual eXtensible LAN (VXLAN)). The data packets, in turn, have the quality of service assurance when they are forwarded along the underlay and overlay paths from virtual machine 1 300 to virtual machine 2 360.

Figure 6:
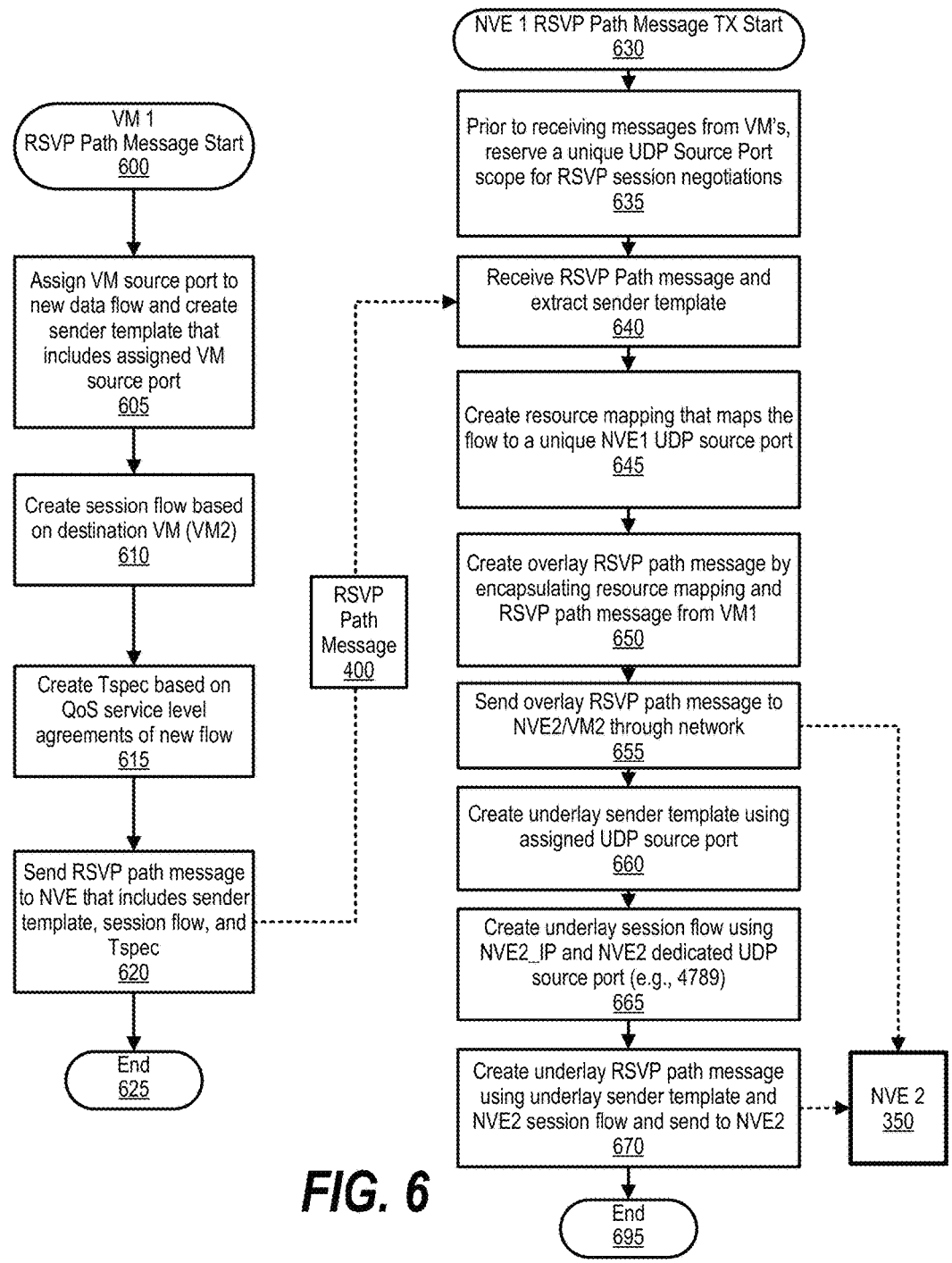
FIG. 6 is an exemplary flowchart depicting steps taken by a network virtualization edge to receive an RSVP path message from a virtual machine and send a corresponding overlay RSVP path message and an underlay RSVP path message to a destination network virtualization edge.

FIG. 6 is an exemplary flowchart depicting steps taken by a network virtualization edge to receive an RSVP path message from a virtual machine and send a corresponding overlay RSVP path message and an underlay RSVP path message to a destination network virtualization edge. Virtual machine (VM) processing commences at 600 whereupon, at step 605, the virtual machine (virtual machine 1 300) assigns a source port to a new flow and creates an RSVP sender template that includes the assigned VM source port, the VM's IP address, and a protocol ID (see FIG. 4, reference numeral 405 and corresponding text for further details).

At step 610, the virtual machine creates a session flow that includes destination virtual machine (e.g., virtual machine 2 360) information such as its IP address, destination port, and protocol ID (see FIG. 4, reference numeral 408 and corresponding text for further details). At step 615, the virtual machine creates a traffic specification (Tspec) based on QoS service level agreements of the new flow (see FIG. 4, reference numeral 409 and corresponding text for further details). At step 620, the virtual machine generates and sends an RSVP path message to its corresponding network virtualization edge (network virtualization edge 1 310). The RSVP path message includes the sender template, the session flow, and the Tspec (see FIG. 4, reference numeral 400 and corresponding text for further details). Virtual machine processing thereafter ends at 625.

Network virtualization edge 1 310 processing commences at 630 whereupon, prior to receiving messages from virtual machine 1 300, the network virtualization edge reserves a unique user datagram protocol (UDP) source port scope for RSVP session negotiations (step 635). For example, a network administrator may set the length of the UDP source port scope to "50000-60000" during system configuration.

At step 640, the network virtualization edge receives RSVP Path message 400 from the virtual machine and extracts the sender template. At step 645, the network virtualization edge creates a resource mapping that maps the flow to a unique UDP source port (from the UDP source port scope). The flow is based on the sender template information and a virtual network identifier (VNID) corresponding to the virtual network upon which the virtual machine operates.

At step 650, the network virtualization edge encapsulates the original RSVP path message, the VNID, and the resource mapping information in an overlay RSVP path message and, at step 655, the network virtualization edge sends the overlay RSVP path message to a destination network virtualization edge (network virtualization edge 2 350). See FIG. 4, reference numeral 420 and corresponding text for further details.

In addition to sending the overlay RSVP path message, the network virtualization edge also sends an underlay RSVP path message to set up the underlay network. This process begins at step 660, whereupon the network virtualization edge creates an underlay sender template that includes the network virtualization edge unique UDP source port (see FIG. 4, reference numeral 465 and corresponding text for further details).

At step 665, the network virtualization edge creates an underlay session flow using network virtualization edge 2 350's IP address and network virtualization edge 2 350's UDP source port that is dedicated for network virtual overlay protocol messages (e.g., 4689). At step 670, the network virtualization edge creates an underlay RSVP path message using the underlay sender template, the underlay session flow, and the Tspec from the original RSVP path message. The network virtualization edge sends the underlay RSVP path message to network virtualization edge 2 350 and network virtualization edge 1 310 processing thereafter ends at 695.

Figure 7:
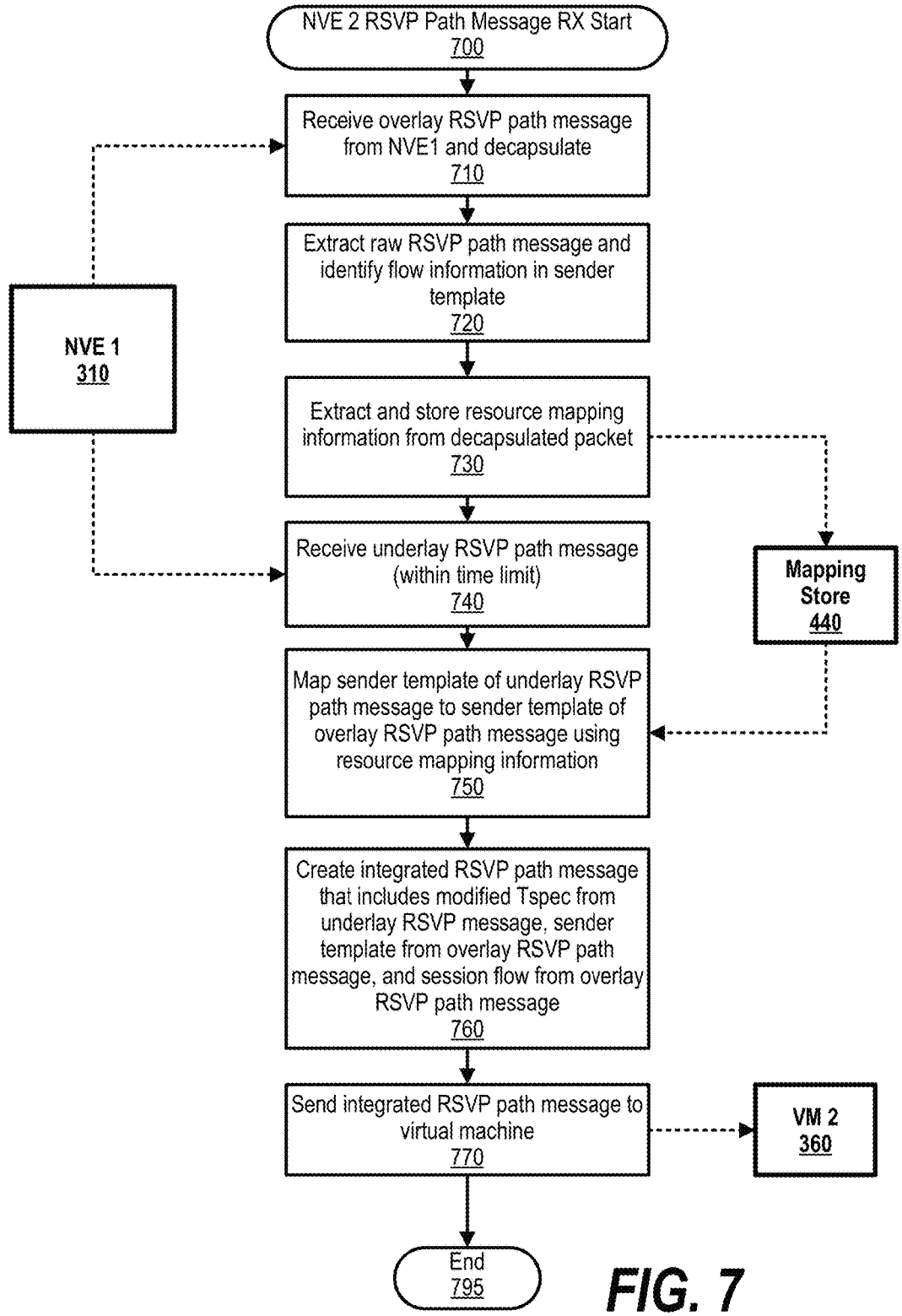
FIG. 7 is an exemplary flowchart depicting steps taken by a network virtualization edge to match an overlay RSVP path message to an underlay RSVP path message and pass an integrated RSVP path message to a destination virtual machine.

FIG. 7 is an exemplary flowchart depicting steps taken by a network virtualization edge to match an overlay RSVP path message to an underlay RSVP path message and pass an integrated RSVP path message to a destination virtual machine. Network virtualization edge 2 350 processing commences at 700 whereupon, at step 710, the network virtualization edge receives and decapsulates an overlay RSVP path message from network virtualization edge 1 310. At step 720, the network virtualization edge extracts the original RSVP path message information and identifies a flow based on information in the sender template of the original RSVP path message and, in one embodiment, also based on the VNID in the overlay RSVP path message. At step 730, the network virtualization edge extracts the resource mapping from the decapsulated packet and stores the resource mapping in mapping store 440 (see mapping store 440 in FIG. 4 and corresponding text for further details).

Next, at step 740, the network virtualization edge receives a corresponding underlay RSVP path message from network virtualization edge 1 310. In one embodiment, the network virtualization edge sets a time limit to receive the underlay RSVP path message. At step 750, the network virtualization edge uses the resource mapping information to map the underlay sender template from the underlay RSVP path message to the sender template of the overlay RSVP path message. Referring to FIG. 4, network virtualization edge 2 350 maps underlay sender template 465 to overlay sender template 405.

At step 760, the network virtualization edge creates an integrated RSVP path message that includes the modified Tspec from the underlay RSVP message, the sender template from overlay RSVP path message, and the session flow from the overlay RSVP path message (see FIG. 4, reference numeral 480 and corresponding text for further details). The network virtualization edge sends the integrated RSVP path message to virtual machine 2 360 (step 770) and processing thereafter ends at 795.

Figure 8:
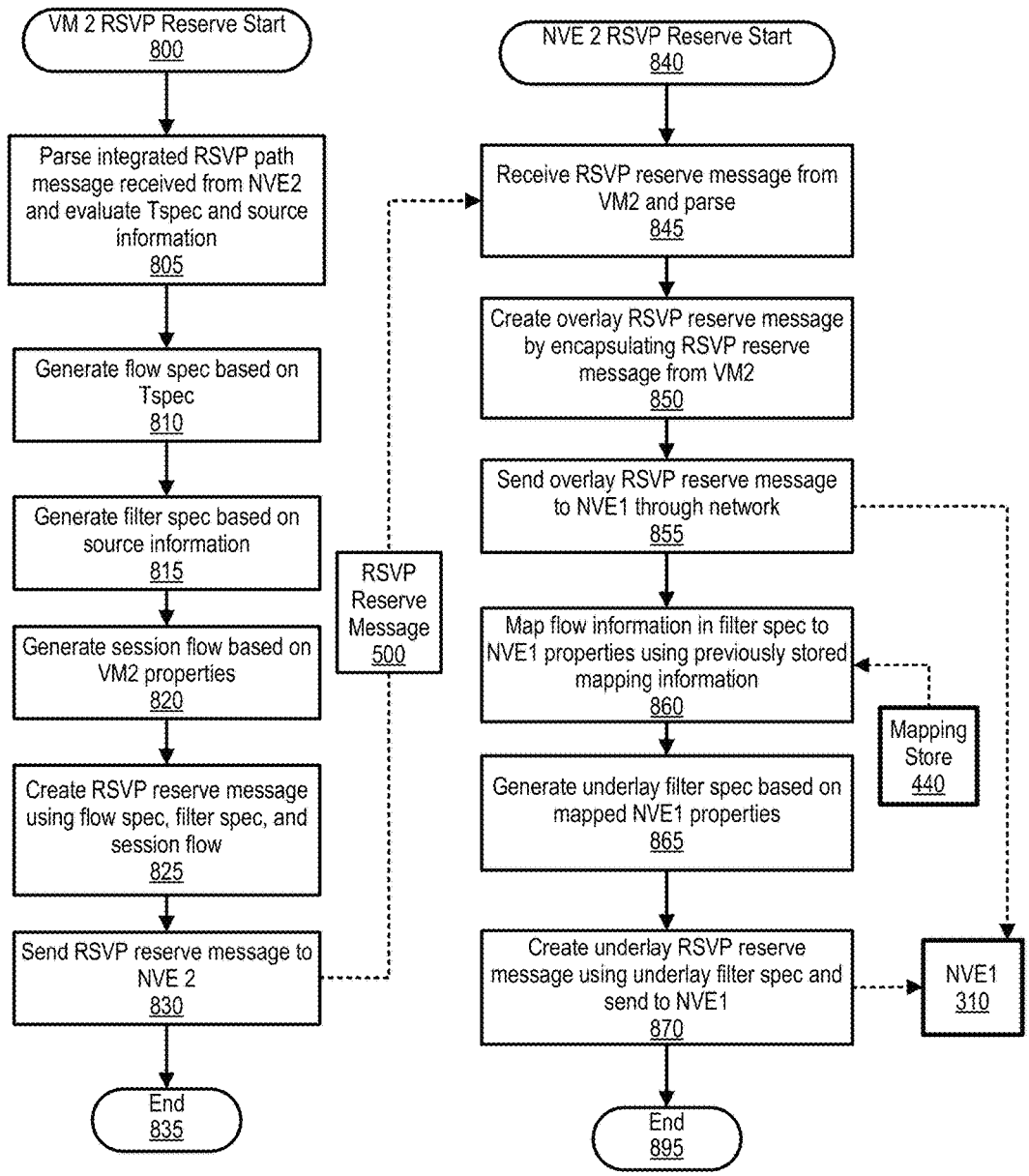
FIG. 8 is an exemplary flowchart depicting steps taken by a network virtualization edge to receive an RSVP reserve message from a virtual machine and send a corresponding overlay RSVP reserve message and an underlay RSVP reserve message to a destination network virtualization edge.

FIG. 8 is an exemplary flowchart depicting steps taken by a network virtualization edge to receive an RSVP reserve message from a virtual machine and send a corresponding overlay RSVP reserve message and an underlay RSVP reserve message to a destination network virtualization edge. Virtual machine 2 360 processing commences at 800 whereupon, at step 805, the virtual machine parses an integrated RSVP path message received from network virtualization edge 2 350 (FIG. 7, step 770), and evaluates the included Tspec and source template information.

At step 810, the virtual machine generates a flow spec based on the Tspec (see FIG. 5, reference numeral 505 and corresponding text for further details). At step 815, the virtual machine generates a filter spec based on the sender template information, such as that shown in FIG. 5, reference numeral 510.

The virtual machine, at step 820, generates a session flow based on the virtual machines properties such as the virtual machine's IP address, destination port, and protocol ID (see FIG. 5, reference numeral 515 and corresponding text for further details). At step 825, the virtual machine creates an original RSVP reserve message that incorporates the flow spec, the filter spec, and the session flow (see FIG. 5, reference numeral 500 and corresponding text for further details).

The virtual machine, at step 830, sends the original RSVP reserve message 500 to its corresponding network virtualization edge (network virtualization edge 2 350) and virtual machine processing thereafter ends at 835.

Network virtualization edge 2 350 processing commences at 840 whereupon, at step 845, the network virtualization edge receives and parses original RSVP reserve message 500. At step 850, the network virtualization edge creates an overlay RSVP reserve message by encapsulating the original RSVP reserve message information that includes the filter spec, the session flow, the flow spec, and a VNID corresponding to the flow. At step 855, the network virtualization edge sends the overlay RSVP reserve message to network virtualization edge 1 310.

At step 860, the network virtualization edge maps the flow information in the filter spec to network virtualization edge 1 310 properties using previously stored resource information in mapping store 440. At step 865, the network virtualization edge generates an underlay filter spec based on the mapped network virtualization edge 1 310 properties (see FIG. 5, reference numeral 550 and corresponding text for further details). At step 870, the network virtualization edge creates an underlay RSVP reserve message using the underlay filter spec, an underlay session flow corresponding to the original session flow, and an underlay flow spec corresponding to the original flow spec. The network virtualization edge sends the underlay RSVP reserve message to network virtualization edge 1 310 (see FIG. 5, reference numeral 540 and corresponding text for further details). Network virtualization edge 2 350 processing thereafter ends at 895.

Figure 9:
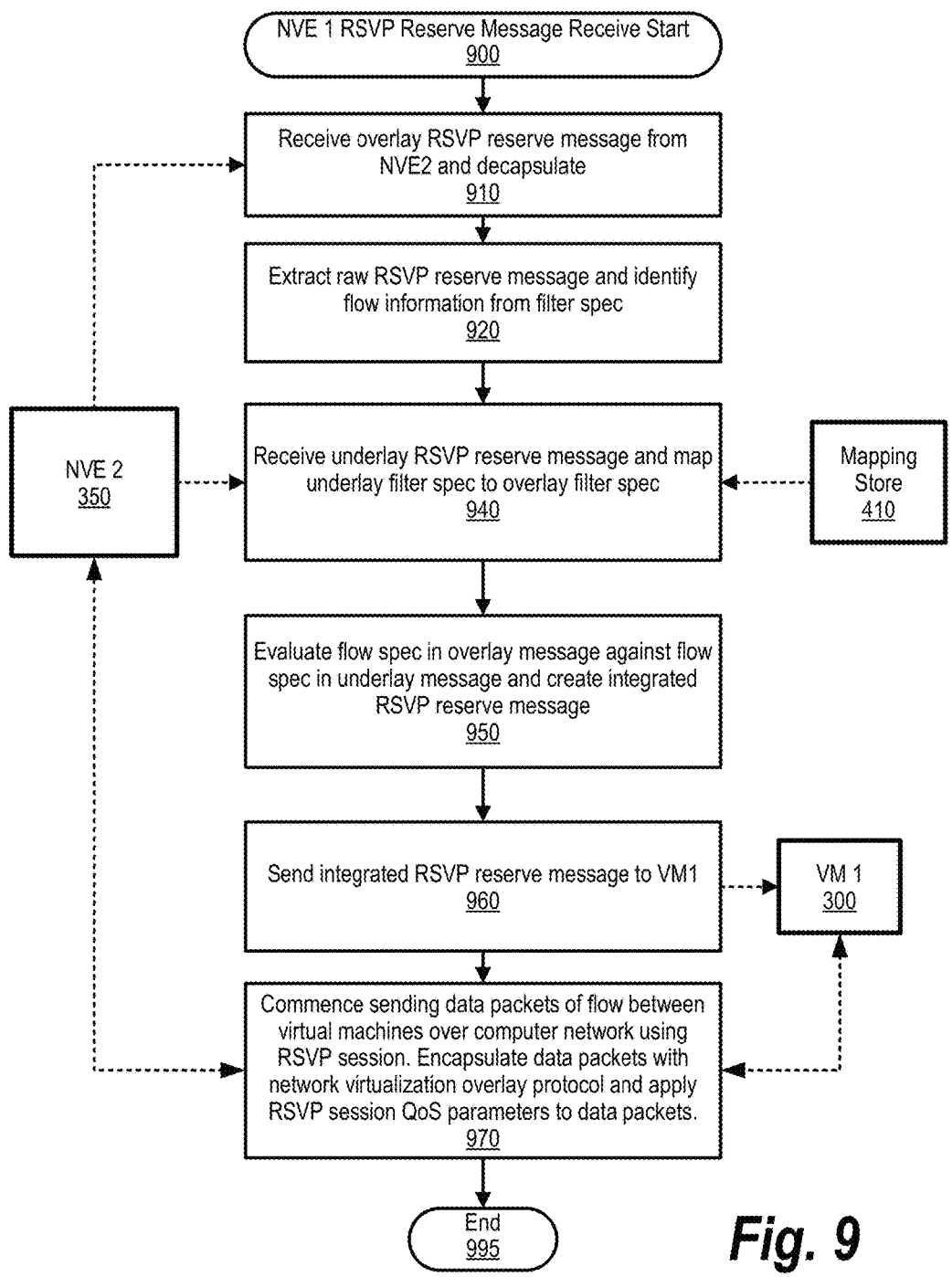
FIG. 9 is an exemplary flowchart depicting steps taken by a network virtualization edge to match an overlay RSVP reserve message to an underlay RSVP reserve message and pass an integrated RSVP reserve message to a destination virtual machine.

FIG. 9 is an exemplary flowchart depicting steps taken by a network virtualization edge to match an overlay RSVP reserve message to an underlay RSVP reserve message and pass an integrated RSVP reserve message to a destination virtual machine.

Network virtualization edge 1 310 processing commences at 900 whereupon, at step 910, the network virtualization edge receives and decapsulates the overlay RSVP reserve message sent by network virtualization edge 2 350 (step 855 in FIG. 8). At step 920, the network virtualization edge extracts the original RSVP reserve message information and VNID from the overlay RSVP reserve message. The network virtualization edge identifies the flow from the filter spec and VNID, which corresponds to virtual machine 1 300.

At step 940, the network virtualization edge receives the underlay RSVP reserve message from network virtualization edge 2 350. The network virtualization edge uses resource mapping information in mapping store 410 to map the underlay filter spec included in the underlay RSVP reserve message to the overlay filter spec included in the overlay RSVP reserve message. Referring to FIG. 5, network virtualization edge 310 maps underlay filter spec 550 to filter spec 510 using the resource mapping information.

At step 950, the network virtualization edge evaluates the flow spec in the overlay RSVP reserve message against the underlay flow spec in the underlay RSVP reserve message. For example, the underlay flow spec may have been modified by one or more routers, switches, etc. while traversing through the computer environment. The network virtualization edge then creates an integrated RSVP reserve message that includes the filter spec and the session flow from the overlay RSVP reserve message and the underlay flow spec from the underlay RSVP reserve message. At step 960, the network virtualization edge sends the integrated RSVP reserve message to virtual machine 1 300 to complete the establishment of the RSVP session.

At this point virtual machine 1 300 and virtual machine 2 350 may commence passing data packets of the flow to each other that will have an applied QoS assurance based on their established RSVP session (step 970). In one embodiment, when data packets are received from a "source" network virtualization edge from its respective "source" virtual machine, the source network virtualization edge uses the resource mapping in mapping store 410 or 440 to apply the corresponding network virtualization overlay (e.g., VXLAN). The source network virtualization edge then sends the encapsulated data packets over the established RSVP session "tunnel," which provides a Quality of Service (QoS) assurance as they are forwarded along the whole underlay path and overlay path from the source virtual machine to a destination virtual machine. In this embodiment, each of the RSVP supported network devices along the route from source network virtual edge to the destination network virtual edge provide the QoS service to the data packets when they forward the data packets according to the QoS parameters negotiated during the RSVP session establishment. When the data packets arrive at the destination network virtual edge, the network virtual edge decapsulates the data packets forwards the decapsulated data packets to the destination virtual machine. Network virtualization edge processing thereafter ends at 995.

While particular embodiments of the present disclosure have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the disclosure is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to disclosures containing only one such element, even when the same claim includes the introductory phrases "one or more" or "at least one" and indefinite articles such as "a" or "an"; the same holds true for the use in the claims of definite articles.

The invention claimed is:

1. A method implemented by an information handling system that includes a memory and a processor, the method comprising:
    establishing a resource reservation protocol (RSVP) session corresponding to a flow between a first virtual machine and a second virtual machine operating within a computer network that implements a network virtualization overlay protocol, wherein the establishing further comprises:
        creating a resource mapping that maps flow information corresponding to an original RSVP path message initiated by the first virtual machine to a unique port of a first network virtual edge;
        sending an overlay RSVP path message comprising the resource mapping from the first network virtual edge to a second network virtual edge, wherein the overlay RSVP message is encapsulated according to the network virtualization overlay protocol;
        sending an underlay RSVP path message comprising the unique port from the first network virtual edge to the second network virtual edge, wherein the underlay RSVP message is unencapsulated by the network virtualization overlay protocol; and
        utilizing, by the second network virtual edge, the resource mapping to map the overlay RSVP path message to the underlay RSVP path message;
    encapsulating, by the first network virtual edge, a data packet corresponding to the flow with an overlay header based on the network virtualization overlay protocol; and
    sending, by the first network virtual edge, the encapsulated data packet over the computer network with a quality of service (QoS) assurance level that is based on the established RSVP session.

2. The method of claim 1 wherein the establishing further comprises:
in response to the mapping of the overlay RSVP path message to the underlay RSVP path message, the second network virtual edge performs further steps of:
extracting an underlay traffic spec from the underlay RSVP path message;
extracting a sender template and a session flow from the overlay RSVP path message;
creating an integrated RSVP path message that includes the underlay traffic spec, the sender template, and the session flow; and
sending the integrated RSVP path message to the second virtual machine.

3. The method of claim 2 wherein the establishing further comprises:
receiving an original RSVP reserve message from the second virtual machine at the second network virtual edge that includes a set of filter spec information corresponding to the first virtual machine;
in response to receiving the original RSVP reserve message, the second network virtual edge performs further steps of:
sending an overlay RSVP reserve message that includes the set of filter spec information to the first network virtual edge, wherein the overlay RSVP reserve message is encapsulated based on the network virtualization overlay protocol; and
sending an underlay RSVP reserve message to the first network virtual edge that includes the unique port of the first network virtual edge in response to matching the set of filter spec information to the resource mapping.

4. The method of claim 3 wherein the establishing further comprises:
mapping, by the first network virtual edge, the overlay RSVP reserve message to the underlay RSVP reserve message based on the resource mapping; and
in response to the mapping of the overlay RSVP reserve message to the underlay RSVP reserve message, the first network virtual edge performs further steps of:
extracting the underlay traffic spec from the underlay RSVP reserve message;
extracting the set of filter spec information from the overlay RSVP reserve message;
creating an integrated RSVP reserve message that includes the underlay traffic spec and the set of filter spec information; and
sending the integrated RSVP reserve message to the first virtual machine.

5. The method of claim 1 further comprising:
identifying, by the first network virtual edge, a first virtual network identifier, from a plurality of virtual identifiers, that corresponds to the flow; and
including the first virtual network identifier in the flow information that is mapped to the unique port of the first network virtual edge.

6. The method of claim 5 wherein:
the computer network is a cloud-based computer network that supports a plurality of tenants that correspond to the plurality of virtual network identifiers;
the overlay header comprises a unique port identifier that identifies the unique port of the first network virtual edge;
the first virtual machine is a source of the data packet and the second virtual machine is a destination of the data packet;
the first virtual network identifier corresponds to a first one of the plurality of tenants utilizing the first virtual machine; and
the first network virtual edge is adapted to concurrently establish a different RSVP session initiated by the first virtual machine, wherein the different RSVP session utilizes a second one of the plurality virtual network identifiers that corresponds to a second one of the plurality of tenants.

7. An information handling system comprising:
one or more processors;
a memory coupled to at least one of the processors;
a set of computer program instructions stored in the memory and executed by at least one of the processors in order to perform actions of:
establishing a resource reservation protocol (RSVP) session corresponding to a flow between a first virtual machine and a second virtual machine operating within a computer network that implements a network virtualization overlay protocol, wherein the establishing further comprises:
creating a resource mapping that maps flow information corresponding to an original RSVP path message initiated by the first virtual machine to a unique port of a first network virtual edge;
sending an overlay RSVP path message comprising the resource mapping from the first network virtual edge to a second network virtual edge, wherein the overlay RSVP message is encapsulated according to the network virtualization overlay protocol;
sending an underlay RSVP path message comprising the unique port from the first network virtual edge to the second network virtual edge, wherein the underlay RSVP message is unencapsulated by the network virtualization overlay protocol; and
utilizing, by the second network virtual edge, the resource mapping to map the overlay RSVP path message to the underlay RSVP path message;
encapsulating, by the first network virtual edge, a data packet corresponding to the flow with an overlay header based on the network virtualization overlay protocol; and
sending, by the first network virtual edge, the encapsulated data packet over the computer network with a quality of service (QoS) assurance level that is based on the established RSVP session.

8. The information handling system of claim 7 wherein the one or more processors perform additional actions comprising:
extracting an underlay traffic spec from the underlay RSVP path message;
extracting a sender template and a session flow from the overlay RSVP path message;
creating an integrated RSVP path message that includes the underlay traffic spec, the sender template, and the session flow; and
sending the integrated RSVP path message to the second virtual machine.

9. The information handling system of claim 8 wherein the one or more processors perform additional actions comprising:
receiving an original RSVP reserve message from the second virtual machine at the second network virtual edge that includes a set of filter spec information corresponding to the first virtual machine;

sending an overlay RSVP reserve message that includes the set of filter spec information to the first network virtual edge, wherein the overlay RSVP reserve message is encapsulated based on the network virtualization overlay protocol; and sending an underlay RSVP reserve message to the first network virtual edge that includes the unique port of the first network virtual edge in response to matching the set of filter spec information to the resource mapping.

10. The information handling system of claim 9 wherein the one or more processors perform additional actions comprising:

mapping, by the first network virtual edge, the overlay RSVP reserve message to the underlay RSVP reserve message based on the resource mapping; and extracting the underlay traffic spec from the underlay RSVP reserve message;

extracting the set of filter spec information from the overlay RSVP reserve message;

creating an integrated RSVP reserve message that includes the underlay traffic spec and the set of filter spec information; and sending the integrated RSVP reserve message to the first virtual machine.

11. The information handling system of claim 7 wherein the one or more processors perform additional actions comprising:

identifying, by the first network virtual edge, a first virtual network identifier, from a plurality of virtual identifiers, that corresponds to the flow; and including the first virtual network identifier in the flow information that is mapped to the unique port of the first network virtual edge.

12. The information handling system of claim 11 wherein:

the computer network is a cloud-based computer network that supports a plurality of tenants that correspond to the plurality of virtual network identifiers;

the overlay header comprises a unique port identifier that identifies the unique port of the first network virtual edge;

the first virtual machine is a source of the data packet and the second virtual machine is a destination of the data packet;

the first virtual network identifier corresponds to a first one of the plurality of tenants utilizing the first virtual machine; and the first network virtual edge is adapted to concurrently establish a different RSVP session initiated by the first virtual machine, wherein the different RSVP session utilizes a second one of the plurality virtual network identifiers that corresponds to a second one of the plurality of tenants.

13. A computer program product stored in a non-transitory computer readable storage medium, comprising computer program code that, when executed by an information handling system, causes the information handling system to perform actions comprising:

establishing a resource reservation protocol (RSVP) session corresponding to a flow between a first virtual machine and a second virtual machine operating within a computer network that implements a network virtualization overlay protocol, wherein the establishing further comprises:

creating a resource mapping that maps flow information corresponding to an original RSVP path message initiated by the first virtual machine to a unique port of a first network virtual edge;

sending an overlay RSVP path message comprising the resource mapping from the first network virtual edge to a second network virtual edge, wherein the overlay RSVP message is encapsulated according to the network virtualization overlay protocol;

sending an underlay RSVP path message comprising the unique port from the first network virtual edge to the second network virtual edge, wherein the underlay RSVP message is unencapsulated by the network virtualization overlay protocol; and utilizing, by the second network virtual edge, the resource mapping to map the overlay RSVP path message to the underlay RSVP path message;

encapsulating, by the first network virtual edge, a data packet corresponding to the flow with an overlay header based on the network virtualization overlay protocol; and sending, by the first network virtual edge, the encapsulated data packet over the computer network with a quality of service (QoS) assurance level that is based on the established RSVP session.

14. The computer program product of claim 13 wherein the information handling system performs further actions comprising:

extracting an underlay traffic spec from the underlay RSVP path message;

extracting a sender template and a session flow from the overlay RSVP path message;

creating an integrated RSVP path message that includes the underlay traffic spec, the sender template, and the session flow; and sending the integrated RSVP path message to the second virtual machine.

15. The computer program product of claim 14 wherein the information handling system performs further actions comprising:

receiving an original RSVP reserve message from the second virtual machine at the second network virtual edge that includes a set of filter spec information corresponding to the first virtual machine;

sending an overlay RSVP reserve message that includes the set of filter spec information to the first network virtual edge, wherein the overlay RSVP reserve message is encapsulated based on the network virtualization overlay protocol; and sending an underlay RSVP reserve message to the first network virtual edge that includes the unique port of the first network virtual edge in response to matching the set of filter spec information to the resource mapping.

16. The computer program product of claim 15 wherein the information handling system performs further actions comprising:

mapping, by the first network virtual edge, the overlay RSVP reserve message to the underlay RSVP reserve message based on the resource mapping; and extracting the underlay traffic spec from the underlay RSVP reserve message;

extracting the set of filter spec information from the overlay RSVP reserve message;

creating an integrated RSVP reserve message that includes the underlay traffic spec and the set of filter spec information; and sending the integrated RSVP reserve message to the first virtual machine.

17. The computer program product of claim 13 wherein the information handling system performs further actions comprising:
- identifying, by the first network virtual edge, a first virtual network identifier, from a plurality of virtual identifiers, that corresponds to the flow; and
- including the first virtual network identifier in the flow information that is mapped to the unique port of the first network virtual edge.

\* \* \* \* \*